(12) United States Patent
Zhu et al.

(10) Patent No.: US 8,009,730 B2
(45) Date of Patent: Aug. 30, 2011

(54) METHOD FOR CONTROLLING THE ENCODER OUTPUT BIT RATE IN A BLOCK-BASED VIDEO ENCODER AND CORRESPONDING VIDEO ENCODER APPARATUS

(75) Inventors: Li Hua Zhu, Beijing (CN); Philippe Guillotel, Vern sur Seiche (FR); Charles Wang, Beijing (CN)

(73) Assignee: Thomas Licensing, Boulogne-Billanco (FR)

( * ) Notice: Subject to any disclaimer, the term of this patent is extended or adjusted under 35 U.S.C. 154(b) by 1494 days.

(21) Appl. No.: 11/439,692

(22) Filed: May 23, 2006

(65) Prior Publication Data

US 2007/0009027 A1 Jan. 11, 2007

(30) Foreign Application Priority Data

May 27, 2005 (EP) .................................... 05300424

(51) Int. Cl.
*H04N 7/12* (2006.01)
*H04N 11/02* (2006.01)
(52) U.S. Cl. .............................. 375/240.02; 375/240.18
(58) Field of Classification Search . 375/240.01–240.26
See application file for complete search history.

(56) References Cited

U.S. PATENT DOCUMENTS

| | | | | |
|---|---|---|---|---|
| 5,410,351 A | * | 4/1995 | Kojima | 375/240.12 |
| 7,190,723 B2 | * | 3/2007 | Schoenblum | 375/240.05 |
| 2003/0202580 A1 | * | 10/2003 | Noh et al. | 375/240.03 |

OTHER PUBLICATIONS

Zhihai He, "A Unified Approach to Rate-Distortion Analysis and Rate Control for Visual Coding and Communication", XP002348975, pp. II-138, Jun. 2001.

Il-Hong Shin, et al., Rate Control Using Linear Rate-p Model for H.264, Signal Processing: Image Communication 19 (2004) pp. 341-352.

Zhengguo Li, et al., Adaptive Rate Control with HRD Consideration, May 26, 2003, pp. 1-18, XP-002328786.

Z. G. Li, et al, "Adaptive Rate Control for H.264", 2004 International Conference on Image Processing (ICIP), XP-002348976, pp. 745-748.

Zhihai He, et al., "A Unified Rate-Distortion Analysis Framework for Transform Coding", IEEE Transactions on Circuits and Systems for Video Technology, vol. 11, No. 12, Dec. 2001, pp. 1221-1236, XP-001092444.

Zhihai He, et al., "Low-Delay Rate Control for DCT Video Coding via p-Domain Source Modeling", IEEE Transactions on Circuits and Systems for Video Technology, vol. 11, No. 8, Aug. 2001, pp. 928-940, XP-001086765.

European Search Report.

Joong-Yun Lee and Hyun Wook Park, "A Rate Control Algorithm for DCT-Based Video Coding Using Simple Rate Estimation and Linear Source Model", XP-002346037, IEEE Transactions on Circuits and Systems for Video Technology, vol. 15, No. 9, Sep. 2005.

* cited by examiner

*Primary Examiner* — David Czekaj
(74) *Attorney, Agent, or Firm* — Robert D. Shedd; Paul P. Kiel; Guy H. Eriksen

(57) ABSTRACT

Constant-bitrate rate control is very useful for real-time video transmission. However, it is difficult to realize a good CBR rate control in an MPEG4-AVC video codec. According to the invention, an adapted $\rho$-domain rate control processing for real-time rate control is applied, whereby $\rho$ is the percentage of zero amplitude transform coefficients following quantization. A couple of tables are used for mapping between the quantization parameters and $\rho$. A detailed analysis at transform level is carried out in order to get the slope of the relationship between the bitrate and $\rho$. The slope of the linear model is constrained by a look-ahead procedure with respect to the neighbor frames or blocks.

11 Claims, 4 Drawing Sheets

METHOD FOR CONTROLLING THE ENCODER OUTPUT BIT RATE IN A BLOCK-BASED VIDEO ENCODER AND CORRESPONDING VIDEO ENCODER APPARATUS

This application claims the benefit, under 35 U.S.C. §119 of European Patent Application 05300424.8 filed May 27, 2005.

FIELD OF THE INVENTION

The invention relates to a method and to an apparatus for controlling the encoder output bit rate in a block-based video encoder, e.g. an MPEG4-AVC encoder.

BACKGROUND OF THE INVENTION

Constant-bitrate (CBR) rate control is very useful for real-time video transmission. However, it is difficult to realize a good CBR rate control in an MPEG4-AVC (ISO/IEC 14496-10) video codec. Generally, in an MPEG4-AVC codec both, bitrate and distortion depend on a quantization parameter QP that controls the degree of quantisation. By adjusting QP one can get a trade-off between rate-QP and distortion-QP. However, most rate control algorithms either do not achieve a good visual quality or suffer from rather large controlling errors. In the Joint Video Team (JVT) reference source codes, use of the rate control algorithms proposed by
Z. Li, W. Gao, F. Pan, S. Ma, K. P. Lin, G. Feng, X. Lin, S. Rahardja, H. Lu and Y. Lu, "Adaptive Rate Control with HRD Consideration", document JVT-H014, 8th meeting, Geneva, May 2003, denoted. [1],
and by Z. G. Li, F. Pan, K. P. Lim, X. Lin and S. Rahardja, "Adaptive Rate Control for H.264", ICIP, 2004, denoted [2], has been recommended by the JVT committee.

Zhihai He has proposed in "ρ-Domain Rate-Distortion Analysis and Rate Control for Visual Coding and Communication", PhD Dissertation, University of California, Santa Barbara, June 2001, denoted [3], a new model that achieves a good performance for H.263 and MPEG4-2 (ISO/IEC 14496-2) codecs. The parameter 'ρ' represents the percentage of zeros among the quantized transform coefficients. He found a basically linear relationship between the value 'ρ' and the real bit rate because the percentage of zeros plays an important role in determining the final bit rate. He assumed that the distribution of residual coefficients complies with either Gaussian distribution or Laplace distribution, so that the linear relationship or model can be derived as follows: The Laplace distribution for the residual image is $$R(\rho)=2*\log_2 e(1-\rho)+O([1-\rho]^3) \quad (1)$$

wherein 'O' is the higher-order infinite small.
The Gaussian distribution for the original image is $$R(\rho) = \log_2 \frac{1+x^a}{1+x^a - 2x + (1-a)(1+x^a)x\ln x} \quad (2)$$

where $$a = \frac{0.5}{0.5+b}, x = 1-\rho$$

and where 'a' and 'b' are statistical parameters of the original image.

The relation between bitrate R and percentage ρ of quantized transform zero values can be approximated by:

$$R(\rho)=\Theta*(100-\rho) \quad (3)$$

wherein ρ is expressed in a % value and Θ is a constant representing the slope of the linear relationship.

The final goal is to find the relation between the percentage ρ of zero coefficients P and the quantization parameter QP. According to Z. He, there is a one-to-one mapping between QP and ρ. Therefore the rate/distortion functions R(QP) and D(QP) in the QP-domain can be mapped in the ρ-domain denoted as R(ρ) and D(ρ), respectively.

For the H.263 video compression the relation between the percentage ρ of zero coefficients P and the quantization parameter QP it is given by:

$$P(QP) = P(QP)_{intra} - P(QP)_{inter} = \qquad (4)$$
$$\sum_{x \in IntraMB}(\text{if}(|x|<2QP)) + \sum_{x \in InerMB}(\text{if}(|x|<2.5QP))$$

This linear ρ-domain model has a good performance with respect to controlling errors and visual quality in MPEG4-2.

A good rate control provides good coding/decoding properties such as small controlling errors and a good visual quality, which both are important for practical MPEG4-AVC applications. However, the quantization processing and the percentage ρ of zeros among the quantized transform or DCT transform (discrete cosine transform) coefficients in MPEG4-AVC is different from that used in MPEG4-2. The original Z. He ρ-domain model cannot be used for an MPEG4-AVC codec because of the conflict between rate/distortion optimization (RDO) and rate control, which both are dependent from the quantization step size.

The above-mentioned rate control algorithms [1] and [2] cause controlling errors in picture sequences including e.g. flashes or in/out fades. The visual quality is unstable because of usage of too much different QPs for different (temporally or spatially adjacent) macroblocks. Moreover, the rate control in [2] employs the information from previous units or scenes so that it is not a suitable solution for coding abrupt changes of scene content in a video sequence.

SUMMARY OF THE INVENTION

A problem to be solved by the invention is to provide an improved bit rate and/or distortion control for MPEG4-AVC applications.

According to the invention, an adapted ρ-domain processing for real-time rate control is applied, which can be directly used in practical applications. A couple of mapping tables have been designed to realize the mapping between the quantization parameters QP and the percentage of transform zero coefficients, the application of which tables does not only improve the mapping accuracy, but also shortens the computation time. The quantization parameter QP is an index or a parameter that codes or represents the quantizer step size. QP may have one of 52 levels between 0 and 51, as is true for MPEG4-AVC. For example, QP=0, 3, 6, 10, 18, 30, 48 and 51 correspond to quantization step sizes of 0.625, 0.875, 1.25, 2, 5, 20, 160 and 224, respectively.

Further, a detailed analysis of the transform level is carried out to get the slope of the (linear) relationship between the bitrate and the percentage values of the zeros.

Finally, the slope of the linear model is constrained by a look-ahead procedure with respect to the neighbour frames or blocks.

Advantageously, the inventive rate control for a one-pass MPEG-4 AVC codec achieves small controlling errors and good visual quality:

it controls accurately the bit rates—only 1% control error per second;
it shortens the computation time for the pre-analysis;
it solves the buffer overflow and underflow problem in MPEG4-AVC.

BRIEF DESCRIPTION OF THE DRAWINGS

Exemplary embodiments of the invention are described with reference to the accompanying drawings, which show in.

DETAILED DESCRIPTION OF PREFERRED EMBODIMENTS $\rho$-Domain

According to [3], the $\rho$-domain control requires the knowledge of the percentage of zeros following quantization in the transform or DCT transform domain for each macroblock in a frame (if the residuum after transform complies with Gaussian or Laplace distribution, the $\rho$-domain can work correctly). However, the rate-distortion optimization (RDO) requires QP to consider motion estimation and mode decision, and for different modes there are different transform coefficients. According to the invention, a simple and accurate residue estimation is used. In addition, side information from the pre-analysis—such as motion vectors and transform coefficients—can be used again, and advantageously shortens the computation time in the RDO step.

Pre-Processing a) 16*16 Macroblock Pre-Analysis

In practical MPEG-4 AVC encoding, following mode decision the majority (generally 60% to 90%) of (macro-)blocks has a size of 16*16 pixels before transform, whereas the transform size is 4*4. To achieve visual smoothness, the QP difference between two neighbouring macroblocks can not be too large. Therefore a frame to be encoded is pre-processed first, and is then processed according to the statistics of the current frame and its neighbour frames in order to carry out the $\rho$-domain rate control. The percentage of quantized zero coefficients controls the final performance of the $\rho$-domain mode.

For an I frame a 16*16-intra prediction only is carried out, using three modes: DC prediction, horizontal prediction and vertical prediction. For a current time instant, the reconstructed intra macroblock is unavailable. Therefore it is important to find a good estimation for the intra macroblock to be reconstructed, i.e. for computing I frame predictions. After many experiments it was found that the picture content of the original frame can be used as the reconstruction, but a modified parameter must be added for bitrate computation according to the QP of the previous macroblock. Following this intra prediction, the residual image is computed according to the best prediction direction. A transform or a DCT transform is applied to the residue of each macroblock, whereby the output transform coefficients are produced, as shown in FIG. 1.

Figure 1:
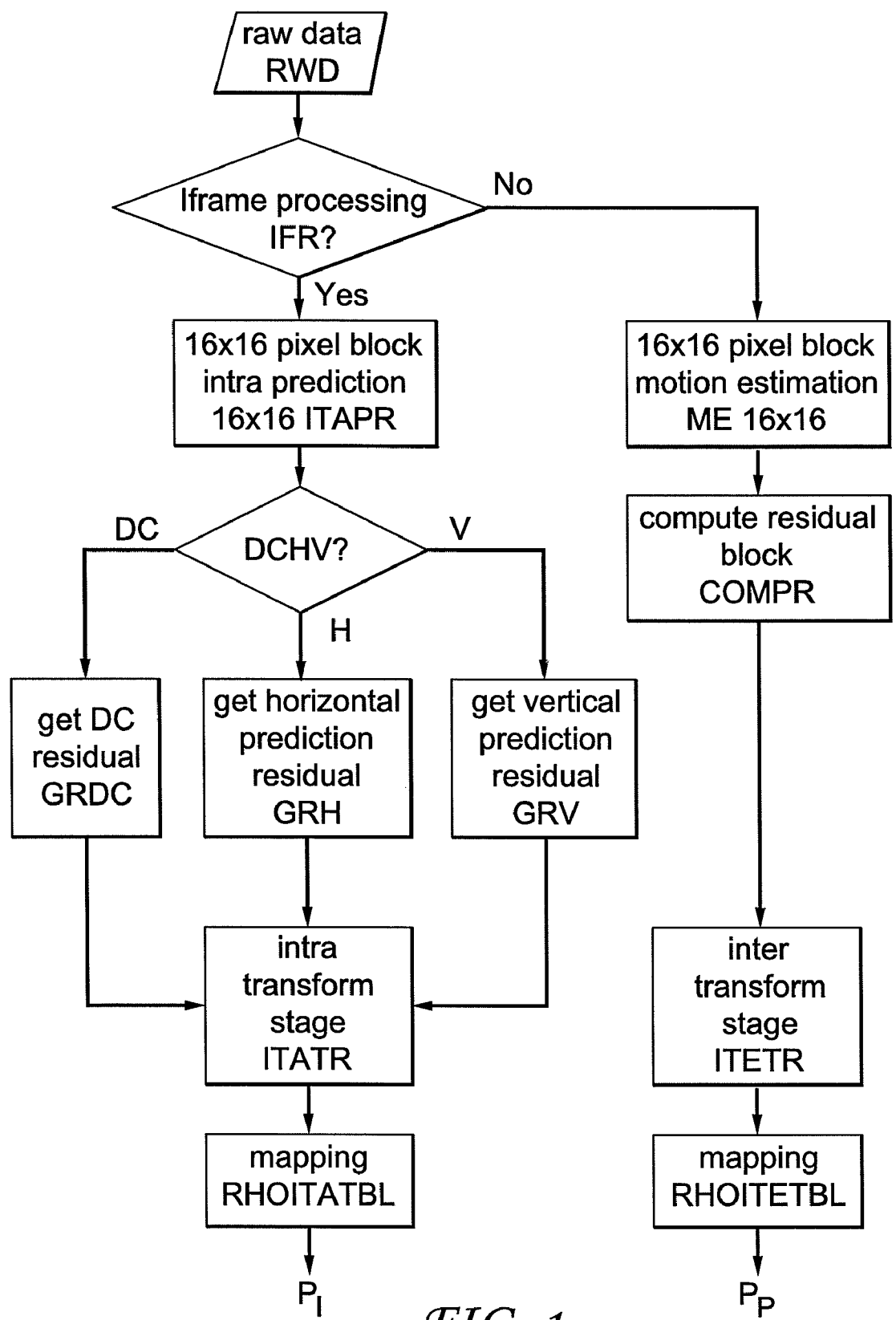
FIG. 1 flowchart for the inventive pre-analysis and $\rho_I$ and $\rho_P$ determination.

For a P frame a 16*16-motion estimation is carried out for each macroblock and then, after applying the motion vectors found, the residue image is transformed according to FIG. 1.

According to FIG. 1, raw data RWD is input to the processing and it is checked in step IFR whether or not an I frame processing is to be performed.

If true, a 16*16 pixel block intra prediction 16*16ITAPR is carried out on macroblocks for this frame, including a check DCHV whether DC prediction, horizontal prediction or vertical prediction is to be performed. A corresponding calculation is carried out in a DC residual getting stage GRDC, a horizontal prediction residual getting stage GRH or a vertical prediction residual getting stage GRV.

As an alternative, check DCHV is omitted and the three predictions are in each case performed in parallel in GRDC, GRH and GRV, followed by a check which one of the three results is to be processed further.

The corresponding result block is transformed into the frequency domain by an intra transform stage ITATR. Thereafter in stage RHOITATBL a mapping (see below) takes place between the transform coefficients and the quantization parameter QP in order to get the $\rho_I$-value (i.e. the number or percentage of zero transform coefficients) for the current block, using the below intra tables 1 to 3 and 7 to 9.

If not true, a 16*16 pixel block motion estimation ME16*16 is carried out on the macroblocks for this frame, followed by computing the residual block in a stage COMPR.

The corresponding result block is transformed in an inter transform stage ITEDCT. Thereafter in stage RHOITETBL a mapping (see below) takes place between the transform coefficients and the quantization parameter QP in order to get the $\rho_P$-value (i.e. the number or percentage of zero transform coefficients) for the current block, using the below inter tables 4 to 6 and 10 to 12.

The output values $\rho_I$ and $\rho_P$ from stages RHOITATBL and RHOITETBL are used for a subsequent rate/distortion optimization RDO.

b) Look-Up Tables Mapping

In stages RHOITATBL and RHOITETBL the intra rho values $\rho_I$ and the inter rho values $\rho_P$ are calculated as a fraction from '1' (or as a percentage value) and as a function of QP, according to below equations (5), wherein M is the number of pixels/coefficients in the current macroblock (i.e. generally the number of luminance pixel values per macroblock is 16*(4*4)=256 and the number of chrominance pixel values per macroblock (for 4:2:0 format) is two times 4*(4*4)=128, resulting in 384 pixel values per macroblock), x is the transformed coefficient at 4*4 transform block position i (0 ... 3) and j (0 ... 3), itable is the intra threshold to decide if the current Intra coefficient is zero, and table is the Inter threshold to decide if the current inter coefficient is zero:

$$\rho_I(QP) = P(QP)_{intra} = \frac{1}{M} \sum_{x \in IntraMB} (\text{if}(|x| < itable(i, j, QP))) \quad (5)$$

$$\rho_P(QP) = P(QP)_{inter} = \frac{1}{M} \sum_{x \in InerMB} (\text{if}(|x| < table(i, j, QP)))$$

The goal is to get for each set of transformed macroblock values in the video sequence the function or relationship between a candidate QP and the resulting number of zero amplitude transform coefficients following quantisation.

The current macroblock status 'Intra' or 'Inter', the current block position (0 . . . 3)(0 . . . 3) and the candidate QP (0 . . . 51) are used to address a corresponding one of tables 1 to 6 in order to get the applicable quantization threshold value for that current QP. Each table includes 52 values, i.e. the quantity of QPs useable in the encoder.

Table 1, intra quantization threshold table for block positions (0,0), (0,2), (2,0), (2,2):
{2,2,3,3,3,3,4,4,5,5,6,6,7,8,9,10,11,12,14,15,18,19,22,24, 27,30,35,38,43,48,54,59,70,75,86,96,107,118,139,150,171,192, 214,235,278,299,342,384,427,470,555,598}

Table 2, intra quantization threshold table for block positions (0,1),(0,3),(1,0),(1,2),(2,1),(2,3),(3,0),(3,2):
{3,3,4,4,5,5,6,6,7,8,9,10,11,12,14,16,17,20,22,24,27,31,34, 39,44,47,54,61,67,77,87,94,107,121,134,154,174,187,214,241, 267,307,347,374,427,481,534,614,694,747,854,961}

Table 3, intra quantization threshold table for block positions (1,1),(1,3),(3,1),(3,3):
{5,5,6,6,7,8,9,10,11,12,14,16,17,19,21,24,27,31,34,38,42,48, 53,61,67,76,84,96,105,121,134,151,167,192,209,242,267,301, 334,384,417,484,534,601,667,767,834,967,1067,1201,1334,1534}

Table 4, inter quantization threshold table for block positions (0,0), (0,2), (2,0),(2,2):
{3,3,3,3,4,4,5,5,6,6,7,8,9,10,11,12,14,15,17,19,22,24,27,30, 34,37,44,47,54,60,67, 74,87,94,107,120,134, 147,174,187,214, 240,267,294,347,374,427,480,534,587,694,747}

Table 5, inter quantization threshold table for block positions (0,1),(0,3),(1,0),(1,2),(2,1),(2,3),(3,0),(3,2):
{4,4,5,5,6,6,7,8,9,10,11,12,14,15,17,19,21,24,28,30,34,38, 42,48,55,59,67,76,84,96,109,117,134,151,167,192,217,234, 267, 301,334,384,434,467,534,601,667,767,867,934,1067,1201}

Table 6, inter quantization threshold table for block positions (1,1),(1,3),(3,1),(3,3):
{6,6,7,8,9,10,11,12,14,15,17,19,21,24,27,30,33,38,42,47,53, 60,66,76,84,94,105,120,131,152,167,188,209,240,261,303,334, 376,417,480,521,605,667,751,834,959,1042,1209,1334,1501, 1667,1917}

These six tables are constructed as follows.

To block positions (0,0), (0,2), (2,0) and (2,2) a position factor $a^2$ is assigned, to block positions (0,1), (0,3), (1,0), (1,2), (2,1), (2,3), (3,0) and (3,2) a position factor $b^2/4$ is assigned, and to block positions (1,1), (1,3), (3,1) and (3,3) a position factor $a*b/2$ is assigned, whereby $a=\frac{1}{2}$, $b=\sqrt{(2/5)}$, and PF is the resulting position factor.

Suppose that a candidate zero value is:

$$Z_{ij}=\text{round}(W_{ij}*PF/Q_{step}),$$

wherein $W_{ij}$ is a transform coefficient value before quantization and $Q_{step}$ is a quantization step size value.

In practise, $|Z_{ij}|=|W_{ij}|*MF+f>>qbits$, wherein $MF=PF/Q_{step}*2^{qbits}$, $qbits=15+\text{floor}(QP/6)$, $f=2^{qbits}/3$ for intra blocks, $f=2^{qbits}/6$ for inter blocks.

For inter blocks, if $W_{ij}<Q_{step}*5/6/PF$, the transform coefficient must be quantized to zero.

For intra blocks, if $W_{ij}<Q_{step}*2/3/PF$, the transform coefficient must be quantized to zero.

Deriving a threshold value that will be quantized to zero: For example, for a transform coefficient at intra block position (0,0), if QP=51 (and thus the corresponding $Q_{step}$=224), the threshold value below which the transform coefficient value will be quantized to zero is 598 because 597.33=224*2/3/PF(0,0), PF(0,0)=$a^2$=¼.

Correspondingly, the intra and inter quantization threshold tables 1 to 6 are derived for QP=0 to QP=51 and for each group of block positions.

For intra blocks, the greatest quantization threshold is 1534. If an intra transform coefficient is greater than 1534 it will be never quantized to zero. For inter blocks, the greatest quantization threshold is 1917. If an inter transform coefficient is greater than 1917 it will be never quantized to zero.

The following tables 7 to 12 can be used to count the number of zero transform coefficients that will be obtained after quantisation, depending from the QP that will be selected. The numbers in these tables represent QP values.

TABLE 7 intra quantization look-up table for block positions
(0, 0), (0, 2), (2, 0), (2, 2):

{0, 1, 2, 2, 6, 8, 10, 12, 13, 14, 15, 16, 17, 18, 18, 19, 20, 20, 20, 21, 22, 22, 22, 23, 23, 24, 24, 24, 25, 25, 25, 26, 26, 26, 26, 26,27, 27, 27, 28, 28, 28, 28, 28, 29, 29, 29, 29, 29, 30, 30, 30, 30, 30, 31, 31, 31, 31, 31, 32, 32, 32, 32, 32, 32, 32, 32, 32, 33, 33, 33, 33, 34, 34, 34, 34, 34, 34, 34, 34, 34, 34, 34, 35, 35, 35, 35, 35, 35, 35, 35, 35, 35, 36, 36, 36, 36, 36, 36, 36, 36, 36, 36, 36, 37, 37, 37, 37, 37, 37, 37, 37, 37, 37, 38, 38, 38, 38, 38, 38, 38, 38, 38, 38, 38, 38, 38, 38, 38, 39, 39, 39, 39, 39, 39, 39, 39, 39, 39, 39, 40, 40, 40, 40, 40, 40, 40, 40, 40, 40, 40, 40, 40, 40, 40, 40, 40, 40, 41, 41, 41, 41, 41, 41, 41, 41, 41, 41, 41, 41, 41, 41, 41, 41, 41, 41, 41, 41, 41, 42, 42, 42, 42, 42, 42, 42, 42, 42, 42, 42, 42, 42, 42, 42, 42, 42, 42, 42, 42, 42, 42, 43, 43, 43, 43, 43, 43, 43, 43, 43, 43, 43, 43, 43, 43, 43, 43, 43, 43, 43, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 45, 45, 45, 45, 45, 45, 45, 45, 45, 45, 45, 45, 45, 45, 45, 45, 45, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51}

This table contains 598 entries.

TABLE 8 intra quantization look-up table for block positions (0, 1),
(0, 3), (1, 0), (1, 2), (2, 1), (2, 3), (3, 0), (3, 2):

{0, 1, 2, 2, 2, 4, 6, 8, 9, 10, 11, 12, 13, 14, 14, 15, 15, 16, 17, 17, 17, 18, 18, 19, 19, 20, 20, 20, 21, 21, 21, 21, 22, 22, 22, 22, 23, 23, 23, 23, 23, 24, 24, 24, 24, 24, 25, 25, 25, 26, 26, 26, 26, 26, 26, 26, 27, 27, 27, 27, 27, 27, 27, 28, 28, 28, 28, 28, 28, 29, 29, 29, 29, 29, 29, 29, 29, 30, 30, 30, 30, 30, 30, 30, 31, 31, 31, 31, 31, 31, 31, 32, 32, 32, 32, 32, 32, 32, 32, 32, 32, 33, 33, 33, 33, 33, 33, 33, 33, 33, 33, 33, 33, 33, 33, 33, 34, 34, 34, 34, 34, 34, 34, 34, 34, 34, 34, 34, 35, 35, 35, 35, 35, 35, 35, 35, 35, 35, 35, 35, 35, 35, 35, 35, 36, 36, 36, 36, 36, 36, 36, 36, 36, 36, 36, 36, 36, 36, 37, 37, 37, 37, 37, 37, 37, 37, 37, 37, 37, 37, 37, 37, 37, 38, 38, 38, 38, 38, 38, 38, 38, 38, 38, 38, 38, 38, 38, 38, 38, 38, 38, 38, 38, 38, 38, 39, 39, 39, 39, 39, 39, 39, 39, 39, 39, 39, 39, 39, 39, 39, 39, 40, 40, 40, 40, 40, 40, 40, 40, 40, 40, 40, 40, 40, 40, 40, 40, 40, 40, 40, 40, 40, 40, 40, 40, 40, 40, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 43, 43, 43, 43, 43, 43, 43, 43, 43, 43, 43, 43, 43, 43, 43, 43, 43, 43, 43, 43, 43, 43, 43, 43, 43, 43, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44,

TABLE 8-continued intra quantization look-up table for block positions (0, 1), (0, 3), (1, 0), (1, 2), (2, 1), (2, 3), (3, 0), (3, 2):

44, 44, 44, 44, 44, 44, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51}

This table contains 961 entries.

TABLE 9 intra quantization look-up table for block positions (1, 1), (1, 3), (3, 1), (3, 3):

{0, 1, 2, 2, 2, 2, 2, 4, 5, 6, 7, 8, 9, 10, 10, 11, 11, 12, 13, 13, 14, 14, 15, 15, 15, 16, 16, 16, 17, 17, 17, 17, 18, 18, 19, 19, 19, 20, 20, 20, 21, 21, 21, 21, 21, 22, 22, 22, 22, 22, 23, 23, 23, 23, 23, 23, 24, 24, 24, 24, 24, 25, 25, 25, 25, 25, 25, 25, 25, 26, 26, 26, 26, 26, 26, 26, 26, 27, 27, 27, 27, 27, 27, 27, 27, 27, 27, 27, 27, 28, 28, 28, 28, 28, 28, 28, 28, 28, 29, 29, 29, 29, 29, 29, 29, 29, 29, 29, 29, 30, 30, 30, 30, 30, 30, 30, 30, 30, 30, 30, 31, 31, 31, 31, 31, 31, 31, 31, 31, 31, 31, 31, 31, 31, 31, 32, 32, 32, 32, 32, 32, 32, 32, 32, 32, 32, 32, 32, 32, 32, 33, 33, 33, 33, 33, 33, 33, 33, 33, 33, 33, 33, 33, 33, 33, 33, 33, 33, 33, 33, 33, 33, 33, 34, 34, 34, 34, 34, 34, 34, 34, 34, 34, 34, 34, 34, 34, 34, 34, 34, 34, 35, 35, 35, 35, 35, 35, 35, 35, 35, 35, 35, 35, 35, 35, 35, 35, 35, 35, 35, 35, 35, 36, 36, 36, 36, 36, 36, 36, 36, 36, 36, 36, 36, 36, 36, 36, 36, 36, 36, 36, 36, 36, 36, 36, 36, 37, 37, 37, 37, 37, 37, 37, 37, 37, 37, 37, 37, 37, 37, 37, 37, 37, 37, 37, 37, 37, 37, 37, 37, 37, 37, 37, 37, 38, 38, 38, 38, 38, 38, 38, 38, 38, 38, 38, 38, 38, 38, 38, 38, 38, 38, 38, 38, 39, 39, 39, 39, 39, 39, 39, 39, 39, 39, 39, 39, 39, 39, 39, 39, 39, 39, 39, 39, 39, 39, 39, 39, 39, 39, 39, 39, 39, 39, 39, 39, 39, 39, 39, 40, 40, 40, 40, 40, 40, 40, 40, 40, 40, 40, 40, 40, 40, 40, 40, 40, 40, 40, 40, 40, 40, 40, 40, 40, 40, 40, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 41, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 42, 43, 43, 43, 43, 43, 43, 43, 43, 43, 43, 43, 43, 43, 43, 43, 43, 43, 43, 43, 43, 43, 43, 43, 43, 43, 43, 43, 43, 43, 43, 43, 43, 43, 43, 43, 43, 43, 43, 43, 43, 43, 43, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 45, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46,

TABLE 9-continued intra quantization look-up table for block positions (1, 1), (1, 3), (3, 1), (3, 3):

46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 50, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51, 51}

This table contains 1534 entries.

TABLE 10 inter quantization look-up table for block positions (0, 0), (0, 2), (2, 0), (2, 2):

{0, 1, 2, 3, 4, 6, 8, 10, 11, 12, 13, 14, 15, 16, 16, 17, 18, 18, 19, 19, 20, 20, 20, 21, 21, 22, 22, 22, 23, 23, 23, 24, 24, 24, 24, 25, 25, 25, 26, 26, 26, 26, 26, 26, 26, 27, 27, 27, 28, 28, 28, 28, 28, 28, 28, 29, 29, 29, 29, 29, 29, 30, 30, 30, 30, 30, 30, 30, 31, 31, 31, 31, 31, 31, 31, 32, 32, 32, 32, 32, 32, 32, 32, 32, 32, 32, 33, 33, 33, 33, 33, 33, 33, 34, 34, 34, 34, 34, 34, 34, 34, 34, 34, 34, 34, 35, 35, 35, 35, 35, 35, 35, 35, 35, 35, 35, 35, 36, 36, 36, 36, 36, 36, 36, 36, 36, 36, 36, 36, 37, 37, 37, 37, 37, 37, 37, 37, 37, 37, 37, 37, 37, 38, 38, 38, 38, 38, 38, 38, 38, 38, 38, 38, 38, 38, 38, 38, 38, 38, 38, 38, 39, 39, 39, 39, 39, 39, 39, 39, 39, 39, 39, 39, 39, 39, 39, 39, 40, 40, 40, 40, 40, 40, 40, 40, 40, 40, 40, 40, 40, 40, 40, 40, 40, 40, 40, 40, 40, 40, 40, 40, 41, 41, 41, 41, 41, 41, 41, 41, 42, 42, 42, 42, 42, 42, 42, 42, 42, 42, 42, 42, 42, 42, 42, 42, 42, 42, 42, 42, 42, 42, 42, 42, 42, 42, 43, 43, 43, 43, 43, 43, 43, 43, 43, 43, 43, 43, 43, 43, 43, 43, 43, 43, 43, 43, 43, 43, 43, 43, 43, 43, 43, 43, 43, 43, 43, 43, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 45, 45, 45, 45, 45, 45, 45, 45, 45, 45, 45, 45, 45, 45, 45, 45, 45, 45, 45, 45, 45, 45, 45, 45, 45, 45, 45, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 46, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 47, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 48, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 49, 50, 50, 50, 50, 50, 50, 50, 50, 50, 50, 50, 50, 50,

TABLE 10-continued inter quantization look-up table for block positions
(0, 0), (0, 2), (2, 0), (2, 2):

50, 50, 50, 50, 50, 50, 50, 50, 50, 50, 50, 50, 50, 50, 50, 50, 50, 50, 50, 50,
50, 50, 50, 50, 50, 50, 50, 50, 50, 50, 50, 50, 50, 50, 50, 50, 50, 50, 50, 50,
50, 50, 50, 50, 50, 50, 50, 50, 50, 50, 50, 50, 50, 50, 50, 50, 50, 50, 50, 50,
50, 50, 50, 50, 50, 50, 50, 50, 50, 50, 50, 50, 50, 50, 50, 50, 50, 50, 50, 50,
50, 50, 50, 50, 50, 50, 50, 50, 50, 50, 50, 50, 51, 51, 51, 51, 51, 51, 51, 51,
51, 51, 51, 51, 51, 51, 51, 51, 51, 51, 51, 51, 51, 51, 51, 51, 51, 51, 51, 51,
51, 51, 51, 51, 51, 51, 51, 51, 51, 51, 51, 51, 51, 51, 51, 51, 51, 51, 51, 51,
51, 51, 51, 51, 51}

This table contains 747 entries.

TABLE 11 inter quantization look-up table for block positions
(0, 1), (0, 3), (1, 0), (1, 2), (2, 1), (2, 3), (3, 0), (3, 2):

{0, 1, 2, 2, 2, 2, 4, 6, 7, 8, 9, 10, 11, 12, 12, 13, 14, 14, 15, 15, 16, 16, 17,
17, 17, 18, 18, 18, 18, 19, 19, 20, 20, 20, 20, 21, 21, 21, 21, 22, 22, 22, 22,
23, 23, 23, 23, 23, 24, 24, 24, 24, 24, 24, 25, 25, 25, 25, 26, 26, 26,
26, 26, 26, 26, 26, 27, 27, 27, 27, 27, 27, 27, 27, 27, 28, 28, 28, 28, 28,
28, 28, 29, 29, 29, 29, 29, 29, 29, 29, 29, 29, 29, 30, 30, 30, 30, 30, 30,
30, 30, 30, 30, 30, 30, 30, 31, 31, 31, 31, 31, 31, 31, 31, 32, 32, 32, 32, 32,
32, 32, 32, 32, 32, 32, 32, 32, 32, 33, 33, 33, 33, 33, 33, 33, 33, 33,
33, 33, 33, 33, 33, 33, 33, 33, 33, 34, 34, 34, 34, 34, 34, 34, 34, 34, 34,
34, 34, 34, 34, 34, 35, 35, 35, 35, 35, 35, 35, 35, 35, 35, 35, 35, 35, 35,
35, 35, 35, 35, 35, 35, 35, 35, 35, 35, 36, 36, 36, 36, 36, 36, 36, 36, 36, 36,
36, 36, 36, 36, 36, 36, 36, 36, 36, 36, 36, 37, 37, 37, 37, 37,
37, 37, 37, 37, 37, 37, 37, 37, 37, 37, 37, 38, 38, 38, 38, 38, 38, 38,
38, 38, 38, 38, 38, 38, 38, 38, 38, 38, 38, 38, 38, 38, 38, 38, 38, 38,
38, 38, 38, 38, 38, 39, 39, 39, 39, 39, 39, 39, 39, 39, 39, 39, 39, 39, 39,
39, 39, 39, 39, 39, 39, 39, 39, 39, 39, 39, 39, 39, 39, 39, 39, 39, 39, 40,
40, 40, 40, 40, 40, 40, 40, 40, 40, 40, 40, 40, 40, 40, 40, 40, 40, 40, 40,
40, 40, 40, 40, 40, 40, 40, 40, 40, 40, 41, 41, 41, 41, 41, 41, 41, 41,
41, 41, 41, 41, 41, 41, 41, 41, 41, 41, 41, 41, 41, 41, 41, 41, 41, 41, 41,
41, 41, 41, 41, 41, 41, 41, 41, 41, 41, 41, 41, 41, 41, 41, 41, 41, 41, 41,
41, 41, 42, 42, 42, 42, 42, 42, 42, 42, 42, 42, 42, 42, 42, 42, 42, 42, 42, 42,
42, 42, 42, 42, 42, 42, 42, 42, 42, 42, 42, 42, 42, 42, 42, 42, 42, 42,
42, 42, 42, 42, 42, 42, 42, 42, 42, 42, 43, 43, 43, 43, 43, 43, 43, 43,
43, 43, 43, 43, 43, 43, 43, 43, 43, 43, 43, 43, 43, 43, 43, 43, 43, 43,
43, 43, 43, 43, 43, 43, 44, 44, 44, 44, 44, 44, 44, 44, 44, 44, 44, 44,
44, 44, 44, 44, 44, 44, 44, 44, 44, 44, 44, 44, 44, 44, 44, 44, 44, 44, 44,
44, 44, 44, 44, 44, 44, 44, 44, 44, 44, 44, 45, 45, 45, 45, 45, 45, 45,
45, 45, 45, 45, 45, 45, 45, 45, 45, 45, 45, 45, 45, 45, 45, 45, 45,
45, 45, 45, 45, 45, 45, 45, 45, 45, 45, 45, 45, 45, 45, 45, 45, 45,
45, 45, 45, 45, 45, 45, 45, 45, 45, 45, 45, 45, 45, 45, 45, 45, 46,
46, 46, 46, 46, 46, 46, 46, 46, 46, 46, 46, 46, 46, 46, 46, 46, 46, 46, 46,
46, 46, 46, 46, 46, 46, 46, 46, 46, 46, 46, 46, 46, 46, 46, 46, 46, 46, 46,
46, 46, 46, 46, 46, 46, 46, 46, 46, 46, 46, 46, 46, 46, 46, 46, 46, 46,
46, 46, 46, 46, 46, 47, 47, 47, 47, 47, 47, 47, 47, 47, 47, 47, 47, 47, 47,
47, 47, 47, 47, 47, 47, 47, 47, 47, 47, 47, 47, 47, 47, 47, 47, 47, 47, 47,
47, 47, 47, 47, 47, 47, 47, 47, 47, 47, 47, 47, 47, 47, 47, 47, 47, 47, 47,
47, 47, 47, 47, 47, 47, 47, 47, 47, 47, 47, 47, 47, 47, 47, 47, 47, 47, 47,
47, 47, 47, 47, 47, 48, 48, 48, 48, 48, 48, 48, 48, 48, 48, 48, 48, 48, 48,
48, 48, 48, 48, 48, 48, 48, 48, 48, 48, 48, 48, 48, 48, 48, 48, 48, 48, 48,
48, 48, 48, 48, 48, 48, 48, 48, 48, 48, 48, 48, 48, 48, 48, 48, 48, 48,
48, 48, 48, 48, 48, 48, 48, 48, 48, 48, 48, 48, 48, 48, 48, 48, 48,
48, 48, 48, 48, 49, 49, 49, 49, 49, 49, 49, 49, 49, 49, 49, 49, 49, 49,
49, 49, 49, 49, 49, 49, 49, 49, 49, 49, 49, 49, 49, 49, 49, 49, 49, 49, 49,
49, 49, 49, 49, 49, 49, 49, 49, 49, 49, 49, 50, 50, 50, 50, 50, 50, 50, 50,
50, 50, 50, 50, 50, 50, 50, 50, 50, 50, 50, 50, 50, 50, 50, 50, 50, 50,
50, 50, 50, 50, 50, 50, 50, 50, 50, 50, 50, 50, 50, 50, 50, 50, 50, 50,
50, 50, 50, 50, 50, 50, 50, 50, 50, 50, 50, 50, 50, 50, 50, 50, 50, 50,
50, 50, 50, 50, 50, 50, 50, 50, 50, 50, 50, 50, 50, 50, 50, 50, 50, 50,
50, 50, 50, 50, 50, 51, 51, 51, 51, 51, 51, 51, 51, 51, 51, 51, 51, 51,
51, 51, 51, 51, 51, 51, 51, 51, 51, 51, 51, 51, 51, 51, 51, 51, 51, 51, 51,
51, 51, 51, 51, 51, 51, 51, 51, 51, 51, 51, 51, 51, 51, 51, 51, 51, 51, 51,
51, 51, 51, 51, 51, 51, 51, 51, 51, 51, 51, 51, 51, 51, 51, 51, 51, 51, 51,

TABLE 11-continued inter quantization look-up table for block positions
(0, 1), (0, 3), (1, 0), (1, 2), (2, 1), (2, 3), (3, 0), (3, 2):

51, 51, 51, 51, 51, 51, 51, 51, 51, 51, 51, 51, 51, 51, 51, 51, 51, 51, 51, 51,
51, 51, 51, 51, 51, 51, 51, 51, 51, 51, 51, 51, 51, 51, 51, 51, 51, 51, 51, 51,
51, 51, 51, 51, 51, 51, 51, 51, 51, 51, 51, 51, 51, 51, 51, 51, 51}

This table contains 1201 entries.

TABLE 12 inter quantization look-up table for block positions
(1, 1), (1, 3), (3, 1), (3, 3):

{0, 1, 2, 2, 2, 2, 2, 2, 3, 4, 5, 6, 7, 8, 8, 9, 10, 10, 11, 11, 12, 12, 13, 13, 13,
14, 14, 14, 15, 15, 15, 16, 16, 16, 17, 17, 17, 17, 17, 18, 18, 18, 18, 19, 19,
19, 19, 19, 20, 20, 20, 20, 20, 20, 21, 21, 21, 21, 21, 21, 21, 22, 22, 22, 22,
22, 22, 23, 23, 23, 23, 23, 23, 23, 23, 23, 23, 24, 24, 24, 24, 24, 24, 24,
25, 25, 25, 25, 25, 25, 25, 25, 26, 26, 26, 26, 26, 26, 26, 26,
26, 27, 27, 27, 27, 27, 27, 27, 27, 27, 27, 27, 27, 27, 27, 27, 28, 28, 28, 28,
28, 28, 28, 28, 28, 28, 28, 29, 29, 29, 29, 29, 29, 29, 29, 29, 29, 29, 29,
29, 29, 29, 29, 29, 29, 29, 29, 30, 30, 30, 30, 30, 30, 30, 30, 30, 30, 30,
30, 30, 30, 31, 31, 31, 31, 31, 31, 31, 31, 31, 31, 31, 31, 31, 31, 31,
31, 31, 31, 32, 32, 32, 32, 32, 32, 32, 32, 32, 32, 32, 32, 32, 32, 32,
32, 32, 32, 32, 32, 33, 33, 33, 33, 33, 33, 33, 33, 33, 33, 33, 33, 33, 33,
33, 33, 33, 33, 33, 33, 33, 33, 33, 33, 33, 33, 33, 33, 33, 33, 34, 34, 34, 34,
34, 34, 34, 34, 34, 34, 34, 34, 34, 34, 34, 34, 34, 34, 35, 35, 35,
35, 35, 35, 35, 35, 35, 35, 35, 35, 35, 35, 35, 35, 35, 35, 35, 35, 35, 35,
35, 35, 35, 35, 35, 35, 35, 35, 35, 35, 35, 35, 35, 35, 35, 35, 36,
36, 36, 36, 36, 36, 36, 36, 36, 36, 36, 36, 36, 36, 36, 36, 36, 36, 36,
36, 36, 36, 36, 36, 36, 36, 36, 36, 36, 37, 37, 37, 37, 37, 37, 37, 37, 37, 37,
37, 37, 37, 37, 37, 37, 37, 37, 37, 37, 37, 37, 37, 37, 37, 37,
37, 37, 37, 37, 37, 37, 37, 37, 37, 37, 37, 38, 38, 38, 38, 38, 38, 38,
38, 38, 38, 38, 38, 38, 38, 38, 38, 38, 38, 38, 38, 38, 38, 38, 38, 38,
38, 38, 38, 38, 38, 38, 38, 38, 38, 38, 38, 39, 39, 39, 39, 39, 39,
39, 39, 39, 39, 39, 39, 39, 39, 39, 39, 39, 39, 39, 39, 39, 39, 39, 39,
39, 39, 39, 39, 39, 39, 39, 39, 39, 39, 39, 39, 39, 39, 39, 39, 39,
39, 39, 39, 39, 39, 39, 39, 39, 39, 39, 39, 39, 39, 40, 40, 40, 40,
40, 40, 40, 40, 40, 40, 40, 40, 40, 40, 40, 40, 40, 40, 40, 40, 40,
40, 40, 40, 40, 40, 40, 40, 40, 40, 40, 40, 40, 40, 40, 41, 41,
41, 41, 41, 41, 41, 41, 41, 41, 41, 41, 41, 41, 41, 41, 41, 41, 41,
41, 41, 41, 41, 41, 41, 41, 41, 41, 41, 41, 41, 41, 41, 41, 41, 41, 41,
41, 41, 41, 41, 41, 41, 41, 41, 41, 41, 41, 41, 41, 41, 41, 41, 41, 41,
41, 41, 41, 41, 41, 41, 41, 41, 41, 41, 41, 41, 41, 41, 41, 41, 41, 41,
41, 42, 42, 42, 42, 42, 42, 42, 42, 42, 42, 42, 42, 42, 42, 42, 42, 42, 42,
42, 42, 42, 42, 42, 42, 42, 42, 42, 42, 42, 42, 42, 42, 42, 42, 42, 42, 42,
42, 42, 42, 42, 42, 42, 42, 42, 42, 42, 42, 42, 42, 42, 42, 42, 42, 42,
42, 42, 42, 43, 43, 43, 43, 43, 43, 43, 43, 43, 43, 43, 43, 43, 43, 43, 43,
43, 43, 43, 43, 43, 43, 43, 43, 43, 43, 43, 43, 43, 43, 43, 43, 43, 43,
43, 43, 43, 43, 43, 43, 43, 43, 43, 43, 43, 43, 43, 43, 43, 43, 43, 43,
43, 43, 43, 43, 43, 43, 43, 43, 43, 43, 43, 43, 43, 43, 43, 43, 43, 43,
43, 43, 43, 43, 43, 43, 43, 44, 44, 44, 44, 44, 44, 44, 44, 44, 44, 44, 44,
44, 44, 44, 44, 44, 44, 44, 44, 44, 44, 44, 44, 44, 44, 44, 44, 44, 44, 44,
44, 44, 44, 44, 44, 44, 44, 44, 44, 44, 44, 44, 44, 44, 44, 44, 44, 44,
44, 44, 44, 44, 44, 44, 44, 44, 44, 44, 44, 44, 44, 44, 44, 44, 44, 44,
44, 44, 44, 44, 44, 44, 44, 44, 44, 44, 45, 45, 45, 45, 45, 45, 45, 45, 45, 45,
45, 45, 45, 45, 45, 45, 45, 45, 45, 45, 45, 45, 45, 45, 45, 45, 45, 45, 45, 45,
45, 45, 45, 45, 45, 45, 45, 45, 45, 45, 45, 45, 45, 45, 45, 45, 45, 45, 45, 45,
45, 45, 45, 45, 45, 45, 45, 45, 45, 45, 45, 45, 45, 45, 45, 45, 45, 45, 45, 45,
45, 45, 45, 45, 45, 45, 45, 45, 45, 45, 46, 46, 46, 46, 46,
46, 46, 46, 46, 46, 46, 46, 46, 46, 46, 46, 46, 46, 46, 46, 46, 46, 46, 46,
46, 46, 46, 46, 46, 46, 46, 46, 46, 46, 46, 46, 46, 46, 46, 46, 46, 46, 46,
46, 46, 46, 46, 46, 46, 46, 46, 46, 46, 46, 46, 46, 46, 46, 46, 47, 47,
47, 47, 47, 47, 47, 47, 47, 47, 47, 47, 47, 47, 47, 47, 47, 47, 47,
47, 47, 47, 47, 47, 47, 47, 47, 47, 47, 47, 47, 47, 47, 47, 47, 47,
47, 47, 47, 47, 47, 47, 47, 47, 47, 47, 47, 47, 47, 47, 47, 47, 47,
47, 47, 47, 47, 47, 47, 47, 47, 47, 47, 47, 47, 47, 47, 47, 47, 47,
47, 47, 47, 47, 47, 47, 47, 47, 47, 47, 47, 47, 47, 47, 47, 47, 47,
47, 47, 47, 47, 47, 47, 47, 47, 47, 47, 47, 47, 47, 47, 47, 47, 47,
47, 47, 47, 47, 48, 48, 48, 48, 48, 48, 48, 48, 48, 48, 48, 48, 48,
48, 48, 48, 48, 48, 48, 48, 48, 48, 48, 48, 48, 48, 48, 48, 48, 48,
48, 48, 48, 48, 48, 48, 48, 48, 48, 48, 48, 48, 48, 48, 48, 48, 48, 48,
48, 48, 48, 48, 48, 48, 48, 48, 48, 48, 48, 48, 48, 48, 48, 48, 48, 48, 48,

TABLE 12-continued inter quantization look-up table for block positions
(1, 1), (1, 3), (3, 1), (3, 3):

48, 48, 48, 48, 48, 48, 48, 48, 48, 48, 48, 48, 48, 48, 48, 48, 48, 48, 48, 48,
48, 48, 48, 48, 48, 48, 48, 48, 48, 48, 48, 48, 48, 48, 48, 48, 48, 48, 48, 48,
48, 48, 48, 48, 48, 48, 48, 48, 48, 49, 49, 49, 49, 49, 49, 49, 49, 49, 49, 49,
49, 49, 49, 49, 49, 49, 49, 49, 49, 49, 49, 49, 49, 49, 49, 49, 49, 49, 49, 49,
49, 49, 49, 49, 49, 49, 49, 49, 49, 49, 49, 49, 49, 49, 49, 49, 49, 49, 49, 49,
49, 49, 49, 49, 49, 49, 49, 49, 49, 49, 49, 49, 49, 49, 49, 49, 49, 49, 49, 49,
49, 49, 49, 49, 49, 49, 49, 49, 49, 49, 49, 49, 49, 49, 49, 49, 49, 49, 49, 49,
49, 49, 49, 49, 49, 49, 49, 49, 49, 49, 49, 49, 49, 49, 49, 49, 49, 49, 49, 49,
49, 49, 49, 49, 49, 49, 49, 49, 49, 49, 49, 49, 49, 49, 49, 49, 49, 49, 49, 49,
49, 49, 49, 49, 49, 49, 49, 49, 49, 49, 49, 49, 49, 49, 49, 49, 49, 49, 49, 49,
49, 49, 49, 49, 49, 49, 49, 49, 49, 49, 49, 49, 49, 49, 49, 49, 50, 50, 50,
50, 50, 50, 50, 50, 50, 50, 50, 50, 50, 50, 50, 50, 50, 50, 50, 50, 50, 50,
50, 50, 50, 50, 50, 50, 50, 50, 50, 50, 50, 50, 50, 50, 50, 50, 50, 50, 50,
50, 50, 50, 50, 50, 50, 50, 50, 50, 50, 50, 50, 50, 50, 50, 50, 50, 50, 50,
50, 50, 50, 50, 50, 50, 50, 50, 50, 50, 50, 50, 50, 50, 50, 50, 50, 50, 50,
50, 50, 50, 50, 50, 50, 50, 50, 50, 50, 50, 50, 50, 50, 50, 50, 50, 50, 50,
50, 50, 50, 50, 50, 50, 50, 50, 50, 50, 50, 50, 50, 50, 50, 50, 50, 50, 50,
50, 50, 50, 50, 50, 50, 50, 50, 50, 50, 50, 50, 50, 50, 50, 50, 50, 50, 50,
50, 50, 50, 50, 50, 50, 50, 50, 50, 50, 50, 50, 50, 50, 50, 50, 50, 50, 50,
50, 50, 50, 51, 51, 51, 51, 51, 51, 51, 51, 51, 51, 51, 51, 51, 51, 51, 51,
51, 51, 51, 51, 51, 51, 51, 51, 51, 51, 51, 51, 51, 51, 51, 51, 51, 51, 51,
51, 51, 51, 51, 51, 51, 51, 51, 51, 51, 51, 51, 51, 51, 51, 51, 51, 51, 51,
51, 51, 51, 51, 51, 51, 51, 51, 51, 51, 51, 51, 51, 51, 51, 51, 51, 51, 51,
51, 51, 51, 51, 51, 51, 51, 51, 51, 51, 51, 51, 51, 51, 51, 51, 51, 51, 51,
51, 51, 51, 51, 51, 51, 51, 51, 51, 51, 51, 51, 51, 51, 51, 51, 51, 51, 51,
51, 51, 51, 51, 51, 51, 51, 51, 51, 51, 51, 51, 51, 51, 51, 51, 51, 51, 51,
51, 51, 51, 51, 51, 51, 51, 51, 51, 51, 51, 51, 51, 51, 51, 51, 51, 51, 51,
51, 51, 51, 51, 51, 51, 51, 51, 51, 51, 51, 51, 51, 51, 51, 51, 51, 51, 51,
51, 51, 51, 51, 51, 51, 51, 51, 51, 51, 51, 51, 51, 51, 51, 51, 51, 51, 51,
51, 51, 51, 51, 51, 51, 51, 51, 51, 51, 51, 51, 51, 51, 51, 51, 51, 51, 51,
51, 51, 51, 51, 51, 51, 51, 51, 51, 51, 51}

This table contains 1917 entries.

The magnitude value of every current candidate transform coefficient addresses the corresponding one from tables 7 to 12. The look-up table output is a corresponding QP number between '0' and '51'. For example, if the current transform coefficient belongs to position (0,0) in an intra block and its magnitude value is '5', only QP=6 or higher can be used to quantize it to zero. Accordingly, in table 7 the position '5' maps to QP=6. E.g. for an intra block, if the current transform coefficient magnitude is between 1482 and 1534 and has a position (1,1), this coefficient is automatically mapped to QP=51.

For intra block coefficient magnitudes greater than 1482 the tables 7 to 10 are not (i.e. need not be) addressed. E.g. for intra block coefficient magnitudes greater than 598 and block positions (0,0), (0,2), (2,0), (2,2) table 7 is not (i.e. need not be) addressed.

These six tables 7 to 12 can be used to quickly map, taking into account the current position in the block and the intra or inter type, between the magnitude of a current transform coefficient and the QP for which this transform coefficient will be quantized to zero.

The QP value resulting from tables 7 to 12 addresses the corresponding one of tables 1 to 6, i.e. table 7 is related to table 1, table 8 is related to table 2, and so on. The output from the corresponding one of tables 1 to 6 is the actual quantization threshold value for the current coefficient magnitude and a given QP.

For each candidate QP value the resulting number of zero coefficients of the block is summed up, following quantization using the corresponding quantization threshold value from tables 1 to 6, so that the functions $\rho_I(QP)$ and $\rho_P(QP)$ can be established.

Thus, when using the tables 1 to 12 it can be easily determined for a block of transform values how many of them will become zero if a specific QP is applied in the quantisation. Using the above tables speeds up the computation and allows to avoid the comparison step (i.e. the if-clause) in equations (5).

Figure 2:
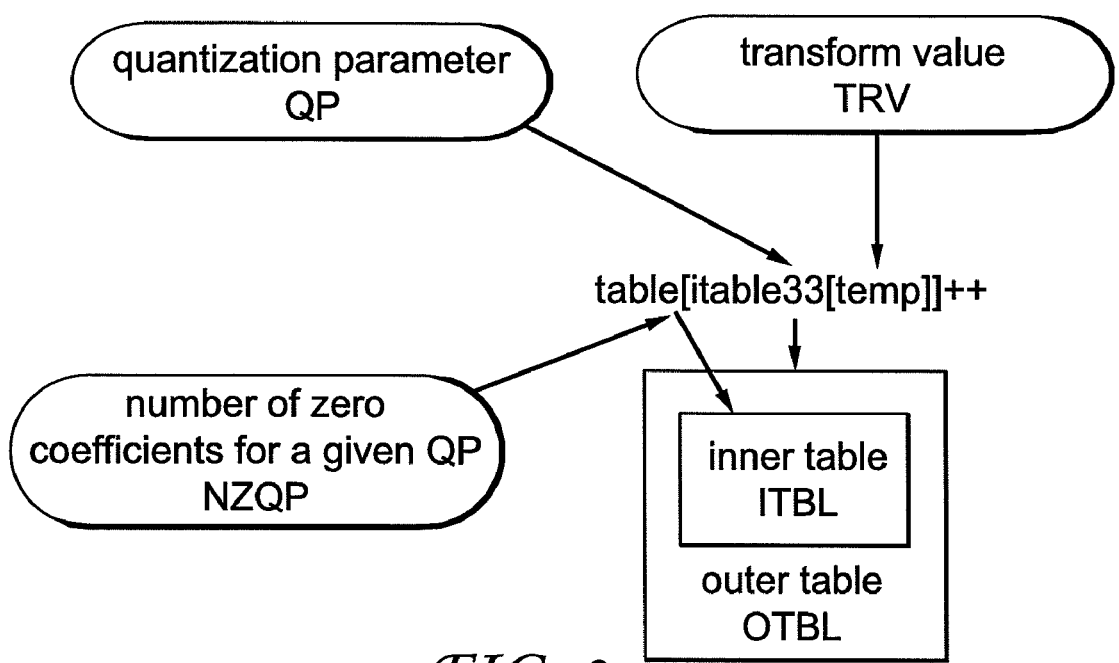
FIG. 2 relation between QP, $\rho$ and a transform value.

The above table processing is depicted by FIG. 2. Tables 7 to 12, which receive the transform value TRV and output the quantization parameter QP, can be regarded as inner table ITBL. The actual number NZQP of zero coefficients for a given QP is calculated using the tables 1 to 6, which can be regarded as outer table OTBL.

The $\rho$-QP lookup mapping table can be built up according to tables 7 to 12. For each QP, the total number of zero coefficients in a transform block can be read from tables 7 to 12. The total number of zero coefficients in a frame for the current QP is summed up from the total number of zero coefficients in a transform block. Finally, this results in the $\rho$-QP lookup mapping table, the size of which is 52, corresponding to QP=0 to QP=51.

Rate Control

The following processing is carried out for the actual encoding of frames of the video sequence.

Figure 3:
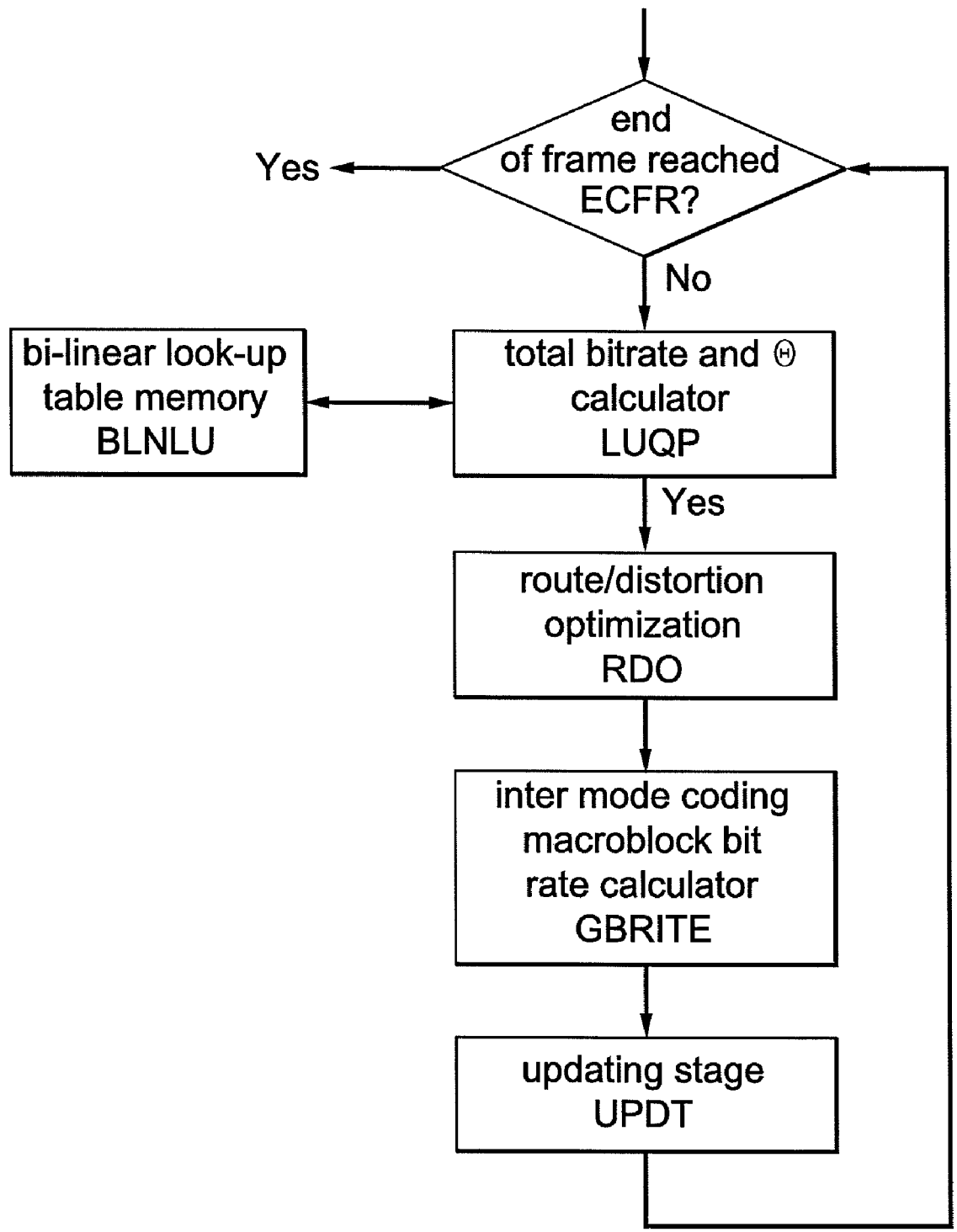
FIG. 3 flowchart for the $\rho$ rate control.

The inventive rate control is shown in connection with FIG. 3. It is checked in a stage ECFR whether or not the end of the current frame has been reached for the processing of the macroblocks. If true, the macroblock processing for the following frame will start. If not true, the following macroblock in the current frame is checked (for intra mode) in a stage LUQP which accesses a memory BLNLU containing the above-described bi-linear look-up tables 1 to 12, and which stage LUQP calculates the current total bitrate and the $\Theta$ value (see equation (3)) for the current frame. Then a rate/distortion optimization step RDO is carried out, using the current $\rho_I$ value. Thereafter the bit rates for the 16*16 inter mode coding of the corresponding macroblock are computed in a stage GBRITE. After performing RDO for each macroblock, the $\rho$ value is adjusted. A following updating stage UPDT computes the real total number of bits and the total number of quantized zero transform coefficients and the value $\Theta$, from the first macroblock of the frame until the current macroblock of the frame.

Step A)

For achieving a low encoding delay condition, it can be assumed that (e.g. for a coding unit such as a group of pictures) only P frames are encoded after the first I frame. Hence the (virtual) encoder buffer can be initialized as follows:

$$B = R/F - \Delta, \qquad (6)$$

$$\Delta = \begin{cases} W/F, & W > Z \cdot \Phi \\ W - Z \cdot M, & \text{otherwise} \end{cases}$$

$$W = \max(W_{prev} + B' - R/F, 0)$$

wherein B is the target number of bits for a frame (including the bits for quantized transform coefficients, motion vectors and header information), R is the channel rate in bits per second, F is the frame rate in frames per second, W is the number of bits in the encoder buffer and represents a modification value for a frame which will be updated after a frame has been coded, $\Phi$ is the maximum buffer size, $W_{prev}$ is the previous number of bits in the buffer, B' is the actual number of bits used for encoding the previous frame, M is the number of transform coefficients in the current macroblock, and Z=0.1 is set as a default value to achieve a low delay. Then the linear model parameter value $\Theta$ is set to 1.5, and the total number of macroblocks for the current frame is initialized.

Step B)

Following the above-described pre-processing step, the mapping table between ρ and QP (0 . . . 51) for each macroblock is obtained.

The QP can be obtained from the above-mentioned ρ-QP lookup mapping table using equation (7):

$$\rho = 384(N-N_m) - (R_c - R_m)/\Theta \qquad (7)$$

wherein 384 is the number of transform coefficients in a macroblock, N is the number of macroblocks per frame, $N_m$ is the number of macroblocks which have already been coded in the current frame, $R_c$ is the encoder output bit rate in bits per second for the current frame, and $R_m$ is the number of bits used by the already encoded macroblocks in the current frame.

When determining the QP for the encoding of the current macroblock, a bi-linear search method can be used to get QP from a P/QP frame mapping table, which is the sum of the macroblock ρ/QP mapping tables described in equations (5).

By using the neighbouring information among the macroblocks, the QP of the current macroblock advantageously is constrained by using the average of the QPs for all prior macroblocks in the current frame until the current macroblock, cf. the pseudo codes (8) and (9). The spatial variations of QP in a frame are preferably smaller than ±3 QP values. Advantageously the difference between the average QP of the current frame and the average QP of previous pictures can be constrained, too. The temporal variations of QP between frames are preferably smaller than ±4 QP values.

According to the goal that the QP of neighbouring macroblocks should not vary too much, the QP of the current macroblock is constrained using the average of the QPs (AverageQP) for all prior macroblocks (mb) in the current frame until the current macroblock. This can described by the following pseudo-code:

```
TempAverageQP = SumQP/number_mb
if(absolute(Delta =(CurrentQP − TempAverageQP) )>3)
{
if(Delta<0)
   Delta = 3;
else
   Delta = −3;
CurrentQP = TempAveraqeQP − Delta;
}                                                         (8)
``` wherein SumQP is the total sum of all QP values in the current frame until the current macroblock, TempAverageQP is the average QP in the current frame until the current macroblock, CurrentQP is the QP of the current macroblock, and "absolute" means calculating the absolute value.

According to the goal that the QP for corresponding macroblocks in temporally adjacent frames should not vary too much, the QP of the current macroblock is further constrained as described by the following pseudo-code:

```
if(absolute(Delta =(CurrentQP − AverageRhoQP))>4)
{
if(Delta<0)
   Delta = 4;
else
   Delta = −4;
CurrentQP = AverageRhoQp − Delta;
}
``` wherein AverageRhoQP is the average QP of one or more previous frames, which can be selected according to the Θ value difference of the different frames.

Step C)

Get the number of zero coefficients (ρ) and of bits for the current macroblock and then update the header and the encoding buffer.

Step D)

Repeat steps B and C until the end of the current frame.

Figure 4A:
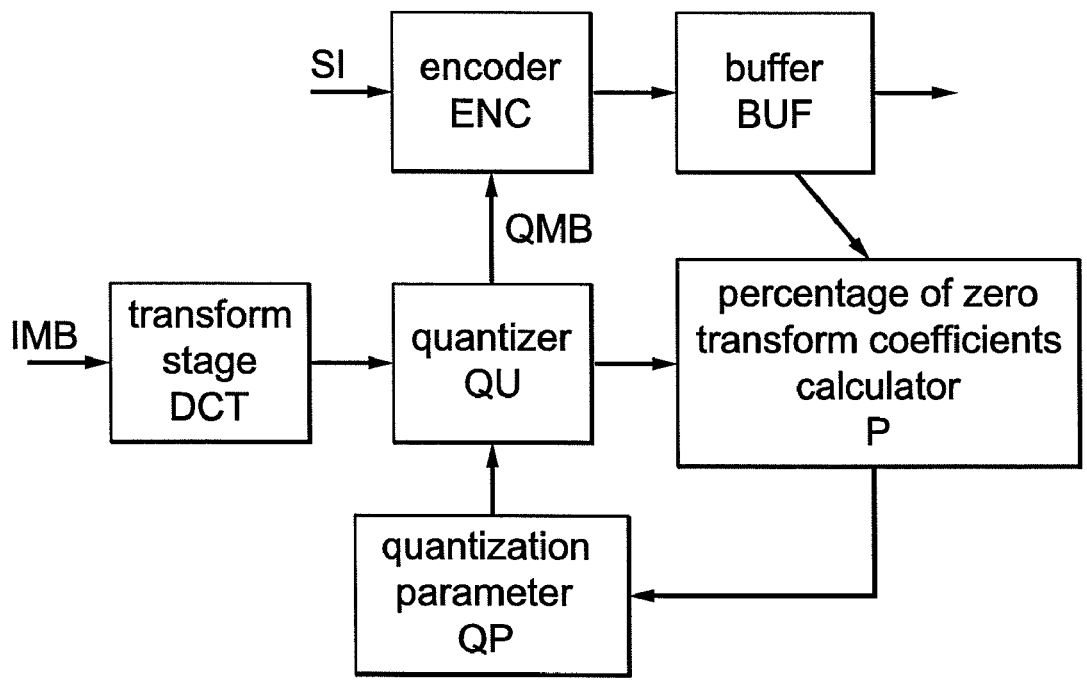
FIG. 4 simplified block diagram of the inventive quantization controller.
Figure 4B:
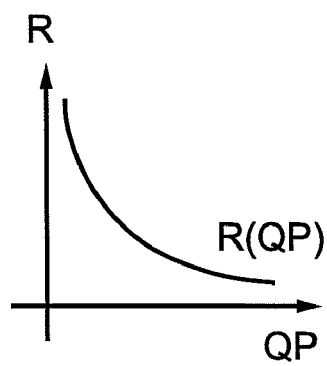
Figure 4C:
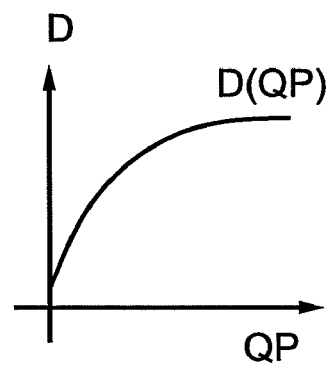

FIG. 4B shows the encoding output bit rate as a known function of QP for a given distortion (i.e. the encoding error), whereas FIG. 4C shows the distortion (i.e. the encoding error) as a known function of QP for a given bit rate.

In FIG. 4A an input macroblock IMB enters a transform stage DCT. The resulting transform coefficients are quantized in a quantizer QU, the characteristic of which is controlled by the quantization parameter QP. In the pre-processing the ρ value for each macroblock is determined in a ρ-stage ρ using candidate QPs and the tables 1 to 12. These tables may be stored in stage ρ or in a controller (not depicted). Quantizer QU outputs the quantized macroblock data QMB to an encoder ENC, e.g. an entropy encoder which may also receive side information SI like motion vectors and header data. The output data of encoder ENC pass through an encoder buffer BUF that outputs the bits to the following channel. Stage ρ, or the controller, also receives information about the filling level of buffer BUF and sets the QP for each macroblock according to the invention, applying a rate/distortion optimization based on the percentage of zero transform coefficients and on an adaptation of the QP with respect to the QP of spatially and/or temporally adjacent macroblocks.

The invention can be used e.g. in a PC or a DSP platform for real-time encoding. It can also be used for other video coding standards like e.g. MPEG2-Video.

A bit stream that was encoded according to the invention can be recorded on a storage medium, e.g. a DVD, Bluray or HD-DVD optical disc.

What is claimed, is:

1. Method for controlling the encoder output bit rate in a block-based video encoder, wherein the transform coefficients derived from a pixel block are quantized using a variable quantization parameter and are encoded, and wherein said quantization parameter is related to the quantizer step size and said pixel blocks can be coded in intra mode or in inter mode, said method including the steps:

determining for each macroblock of a frame containing one or more of said blocks of transform coefficients, which percentage ρ of the quantized coefficients gets the amplitude 'zero' depending on an applied value of said quantization parameter;

based on the resulting information about the ρ value/quantization parameter relationship for the macroblocks of said frame, controlling the encoder output bit rate R for said frame, when processing said macroblocks, by using said quantization parameter value such that the control of the bit rate R is based on R(ρ)=Θ*(100−ρ), Θ being a constant, wherein, when controlling the encoder output bit rate R by using said quantization parameter value, the quantization parameter value applied to the current macroblock is constrained by a pre-determined deviation from the average of the quantization parameter values for all prior macroblocks in the current frame until the current macroblock, and wherein said percentage ρ determination for each macroblock of transform coefficients of a frame is carried out using two different types of look-up tables, a first type mapping the coding mode, the position of a transform coefficient in a block and the magnitude value of transform coefficients to a corresponding candidate quantization parameter value, a second type mapping the coding mode, the position of a transform coefficient in a block and a candidate quantization parameter to an applicable quantization threshold value for a quantization parameter.

2. Method according to claim 1, wherein said video encoder encodes an MPEG4-AVC video signal.

3. Method according to claim 1, wherein the quantization parameter value applied to the current macroblock in the current frame is constrained such that the average of the quantization parameter values applied to the previous macroblocks in the current frame does not deviate more than a pre-determined value from the average of the quantization parameter values applied to the macroblocks in a previous frame.

4. Method according to claim 1, wherein when determining for each macroblock of a frame which percentage ρ of the quantized coefficients gets the amplitude 'zero' depending on an applied value of said quantization parameter, for said blocks, when processed according to intra coding mode, a 16*16-intra prediction only is carried out using the modes DC prediction, horizontal prediction and vertical prediction.

5. Method according to claim 4, wherein as an estimation for the intra macroblock to be reconstructed the picture content of the original frame is used as the reconstruction.

6. A block-based video encoder apparatus, wherein for controlling the encoder output bit rate the transform coefficients derived from a pixel block are quantized using a variable quantization parameter and are encoded, and wherein said quantization parameter is related to the quantizer step size and said pixel blocks can be coded in intra mode or in inter mode, said apparatus including:
   means being adapted for determining for each macroblock of a frame containing one or more of said blocks of transform coefficients, which percentage ρ of the quantized coefficients gets the amplitude 'zero' depending on an applied value of said quantization parameter;
   controlling means being adapted for controlling, based on the resulting information about the ρ value/quantization parameter relationship for the macroblocks of said frame, the encoder output bit rate R for said frame, when processing said macroblocks, by using said quantization parameter value such that the control of the bit rate R is based on $R(\rho)=\Theta*(100-\rho)$, Θ being a constant,
   whereby said controlling means constrain the quantization parameter value applied to the current macroblock by a pre-determined deviation from the average of the quantization parameter values for all prior macroblocks in the current frame until the current macroblock, and
   wherein said percentage ρ determination for each macroblock of transform coefficients of a frame is carried out using two different types of look-up tables,
      a first type mapping the coding mode, the position of a transform coefficient in a block and the magnitude value of transform coefficients to a corresponding candidate quantization parameter value,
      a second type mapping the coding mode, the position of a transform coefficient in a block and a candidate quantization parameter to an applicable quantization threshold value for a quantization parameter.

7. Method according to claim 6, or apparatus according to claim 2, wherein said video encoder encodes an MPEG4-AVC video signal.

8. Apparatus according to claim 6, wherein the quantization parameter value applied to the current macroblock in the current frame is constrained such that the average of the quantization parameter values applied to the previous macroblocks in the current frame does not deviate more than a pre-determined value from the average of the quantization parameter values applied to the macroblocks in a previous frame.

9. Apparatus according to claim 6, wherein when determining for each macroblock of a frame which percentage ρ of the quantized coefficients gets the amplitude 'zero' depending on an applied value of said quantization parameter, for said blocks, when processed according to intra coding mode, a 16*16-intra prediction only is carried out using the modes DC prediction, horizontal prediction and vertical prediction.

10. Apparatus according to claim 9, wherein as an estimation for the intra macroblock to be reconstructed the picture content of the original frame is used as the reconstruction.

11. A computer-readable non-transitory storage medium having stored thereupon encoded video data output from a block-based video encoder in which transform coefficients derived from a pixel block were quantized using a variable quantization parameter and were encoded, wherein said quantization parameter was related to the quantizer step size and said pixel blocks were coded in an intra mode or in an inter mode, and wherein the encoder output bit rate of said bit stream data was generated by the following steps:
   determining for each macroblock of a frame containing one or more of said blocks of transform coefficients, which percentage ρ of the quantized coefficients gets the amplitude 'zero' depending on an applied value of said quantization parameter;
   based on the resulting information about the ρ value/quantization parameter relationship for the macroblocks of said frame, controlling the encoder output bit rate R for said frame, when processing said macroblocks, by using said quantization parameter value such that the control of the bit rate R was based on $R(\rho)=\Theta*(100-\rho)$, Θ being a constant,
   wherein, when controlling the encoder output bit rate R by using said quantization parameter value, the quantization parameter value applied to the current macroblock was constrained by a pre-determined deviation from the average of the quantization parameter values for all prior macroblocks in the current frame until the current macroblock, and
   wherein said percentage ρ determination for each macroblock of transform coefficients of a frame was carried out using two different types of look-up tables,
      a first type mapping the coding mode, the position of a transform coefficient in a block and the magnitude value of transform coefficients to a corresponding candidate quantization parameter value,
      a second type mapping the coding mode, the position of a transform coefficient in a block and a candidate quantization parameter to an applicable quantization threshold value for a quantization parameter.

* * * * *